United States Patent [19]

Greener

[11] Patent Number: 4,582,655

[45] Date of Patent: Apr. 15, 1986

[54] PRODUCTION OF OPTICAL ELEMENT WITH A VARYING REFRACTIVE INDEX

[75] Inventor: Jehuda Greener, Rochester, N.Y.

[73] Assignee: Eastman Kodak Company, Rochester, N.Y.

[21] Appl. No.: 554,864

[22] Filed: Nov. 25, 1983

[51] Int. Cl.³ .............................................. B29D 11/00
[52] U.S. Cl. ........................................ 264/2.2; 65/66; 65/83; 65/85; 264/1.1; 264/1.5; 264/2.7
[58] Field of Search ................... 264/1.1, 1.3, 1.4, 2.2, 264/2.3, 2.7, 1.5; 65/45, 63, 64, 66, 85, 83

[56] References Cited

U.S. PATENT DOCUMENTS

| | | | |
|---|---|---|---|
| 3,380,718 | 4/1968 | Neefe | 264/2.2 |
| 3,434,821 | 3/1969 | Wiley | 65/66 |
| 3,486,808 | 12/1969 | Hamblen | 350/175 |
| 3,549,345 | 12/1970 | Wainwright | 65/66 |
| 3,718,383 | 2/1973 | Moore | 350/175 |
| 3,760,045 | 9/1973 | Thiele et al. | 264/2.3 |
| 4,008,031 | 2/1977 | Weber | 264/2.2 |
| 4,012,215 | 3/1977 | Schwab et al. | 65/66 |
| 4,022,855 | 5/1977 | Hamblen | 264/1 |
| 4,284,591 | 8/1981 | Neefe | 264/1.1 |
| 4,364,878 | 12/1982 | Lahiberte et al. | 264/2.2 |

OTHER PUBLICATIONS

Wood, R. W., *Physical Optics*, 2 Ed., MacMillan, N.Y., 1911, pp. 86–89.
Wales, Van Leeuwen, and VanVijgh, "Some Aspects of Orientation in Injection Molded Objects, *Polymer Engineering and Science*, vol. 12, No. 5, 358, 1972.
Dietz, White, and Clark, "Orientation Development and Relaxation in Relaxation in Injection Molding of Amorphous Polymers", *Polymer Engineering and Science*, vol. 18, No. 4, 273, Mar. 1978.
McKinney and Shimha, *National Bureau of Standards Journal of Research*, 81A, 283 (1977).
Moore, "Gradient-Index Optics: A Review", *Applied Optics*, vol. 19, No. 7, 1035, Apr., 1980.
Greener and Kenyon, "Thermal Stresses in Amorphous Plastics", Presented at SPIE Symposium, Aug., 1981.

*Primary Examiner*—James Lowe
*Attorney, Agent, or Firm*—Arthur H. Rosenstein

[57] ABSTRACT

An optical element, consisting essentially of an amorphous compound and having a varying refractive index, is prepared by introducing a melt of the material into a mold and cooling it in such a manner that the material gradually solidifies, while simultaneously applying a programmed pressure to the cooling melt. When the material is fully solidified, it possesses a refractive index gradient. An element manufactured by this method has a capacity for guiding and focusing light.

9 Claims, 4 Drawing Figures

PRODUCTION OF OPTICAL ELEMENT WITH A VARYING REFRACTIVE INDEX

FIELD OF THE INVENTION

This invention relates in general to the manufacture of optical elements and in particular to the manufacture of optical elements in which the refractive index varies throughout the element. More specifically, this invention relates to the manufacture of optical elements consisting essentially of an amorphous compound and possessing a refractive index gradient (RIG).

BACKGROUND OF THE INVENTION

It is well known in the field of optics that optical elements suitable for the purpose of guiding and focusing light can be manufactured from amorphous materials, such as glass or plastic, by imparting curvature to the optical faces of the elements to form lenses. To impart a precise curvature which is required for most optical applications, various grinding, molding, and polishing techniques must be used. These techniques are often costly and difficult to perform.

It is also known that imparting a gradient in the refractive index (RIG) of an optical element in a direction perpendicular to the direction in which electromagnetic radiation propagates, i.e., perpendicular to the optical axis of the element, renders it suitable for guiding and focusing light without the necessity of imparting curvature to the optical faces of the element. The optical axis of an element is parallel to the direction in which electromagnetic radiation propagates through the element. Such elements can be used to replace standard curved lenses. RIG techniques can also be combined with conventional lens-making technology, e.g., grinding and molding, to form lenses having curved surfaces, but which possess optical properties that are otherwise difficult to achieve via conventional lens-making processes.

Known processes for manufacturing RIG elements involve mixing or diffusing a foreign material into the element matrix. By creating a concentration gradient of the foreign material in the matrix, a refractive index gradient is imparted to the element. A review of known RIG element manufacturing techniques can be found in D. T. Moore, "Gradient-Index Optics: A Review", *Applied Optics*, 19, 7, April, 1980. The techniques are divided into six categories: (1) neutron irradiation, (2) chemical vapor deposition, (3) polymerization techniques, (4) ion exchange, (5) ion stuffing, and (6) crystal growing.

The diffusion of a material into a glass element is disclosed in U.S. Pat. No. 3,486,808, in which an optical RIG element is produced by treating the surface of a borate or alkali silica glass with a molten salt containing cations of silver or thallium. As the cations diffuse into the glass, the resulting ion exchange process causes the co-ion (e.g., alkali) in the glass to be replaced by the counter-ion (e.g., silver). The concentration gradient of the counter-ion and the RIG can be made approximately linear. A similar ion-exchange technique, involving the replacement of lithium ions contained in the glass with sodium ions from a fused salt bath, is described by Pearson et al. in "Preparation of a Light Focusing Glass Rod by Ion Exchange Techniques", *Applied Physics Letters*, 15, 76, July, 1969.

U.S. Pat. No. 4,277,271 discloses a method of manufacturing a RIG optical fiber which involves enveloping a core glass with a cladding glass having a different refractive index. The glasses are melted at a temperature high enough to cause partial mixing of the cladding and core glasses. The mixed glasses have an index of refraction somewhere between that of the core and the cladding glasses. The temperature is then elevated further and the glasses are drawn into a fiber.

The diffusion of a material into a plastic element is also used to produce optical elements with refractive index gradients. U.S. Pat. No. 3,718,383 describes the manufacture of a plastic lens-like optical element with a RIG. In this method, a diluent of a low molecular weight organic fluid, such as ethylene diacetate, is diffused into a transparent polymeric matrix, such as poly(methyl methacrylate). The diluent is distributed by diffusion into the matrix to form a continuous gradient of refractive index.

A process for making a polymeric optical RIG element by diffusing two copolymerizable monomers having different refractive indices, and then polymerizing, is described in U.S. Pat. No. 4,022,855. The first monomer is placed in a mold rotating fast enough to hold the monomer against the outside edge of the mold. The second monomer, having a different refractive index than the first, is injected into the center of the mold, and the rotation is slowed to cause diffusion of the two monomers. Ultraviolet light is used to initiate polymerization and adjust the rate of diffusion by controlling the rate of viscosity increase. Polymerization is then completed by heat curing.

The above techniques often require long times and great expense to establish the proper gradients. The present invention allows an optical RIG element to be prepared without the need to mix or diffuse a second material into the element matrix.

SUMMARY OF THE INVENTION

According to the present invention, an optical RIG element is prepared by cooling a molten amorphous material in such a manner as to cause a gradual solidification, while simultaneously varying the pressure applied to the material.

In some embodiments of the invention, the pressure applied to the material may be either an increasing or a decreasing function of time. An increase in pressure during solidification will cause the material domain that solidifies first to have a lower refractive index than the material domain that solidifies last. Conversely, decreasing the pressure during solidification will cause the material domain that solidifies first to have a higher refractive index than the material domain that solidifies last.

In another embodiment of the invention, the molten material is introduced into a cylindrical cavity in a mold where it is cooled and gradually solidified while the pressure in the cavity varies with time. Finally, after it has fully solidified, the cylindrical rod is sliced into circular disks.

In still another embodiment of the invention, the amorphous material is an organic polymer.

DESCRIPTION OF THE PREFERRED EMBODIMENTS

Figure 1:
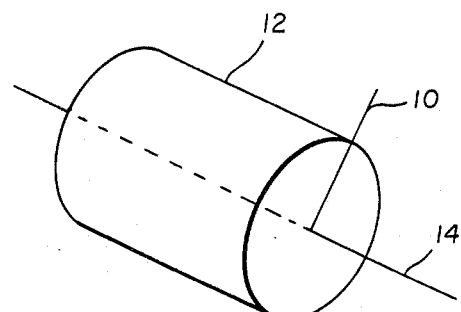
FIG. 1 shows a first illustrative embodiment of the invention in which a cylindrical element has a refractive index that varies along the radius of the cylinder.

In a preferred embodiment of this invention, an optical element as shown in FIG. 1 is prepared by introducing a molten amorphous material into a cylindrical cavity in a mold. The mold is cooled to below the glass transition temperature of the material such that the material gradually solidifies along radial axis 10, first at surface 12 of the cylinder and finally at longitudinal axis 14. While the material is solidifying, the pressure applied to the material is varied to induce a radial variation in the refractive index in the cylindrical solid rod.

While the inventor does not wish to be bound by any theoretical explanation of the mechanism by which the present invention functions, it is believed that the applied pressure during solidification ('formation pressure') determines the final density of the solid material. The differences in density correspond to differences in molecular order and free volume in the solid amorphous matrix. This is believed to affect also the refractive index of the material. (A more complete discussion of pressure-induced densification is given by J. E. McKinney and R. Simha in J. Res. NBS, 81A, 283 (1977)).

Figure 2:
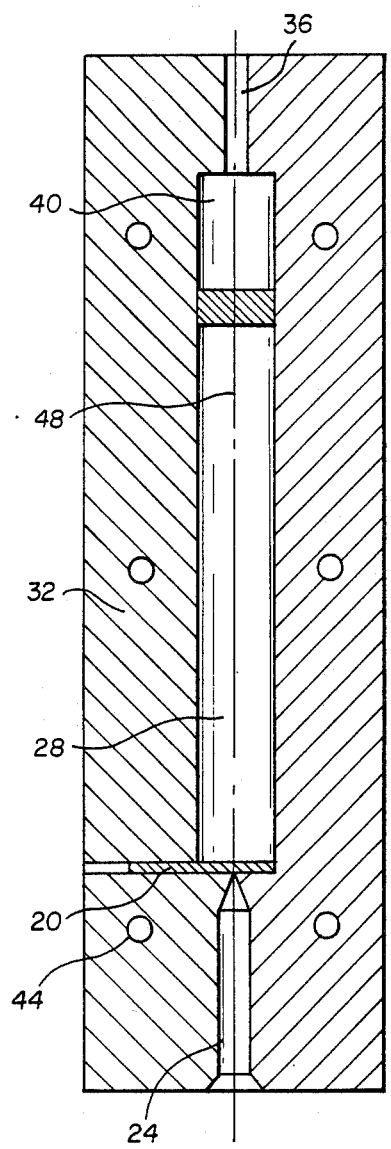
FIG. 2 is a side view of an apparatus which may be used to practice an embodiment of the method of the present invention.

The apparatus shown in FIG. 2 is a hollow cylindrical mold used for preparing the optical element of FIG. 1. This is done by injecting a polymer melt into the cylindrical cavity. With gate 20 open, the molten polymer flows through runner 24 into cylindrical cavity 28 which is contained by steel mold 32. The cavity may be of any size, but its length-to-diameter ratio should be chosen so as to minimize edge effects due to cooling and solidification of the molten polymer along the longitudinal axis of the cylinder. When the cavity is filled, gate 20 is closed. If any initial pressure is desired at the start of solidification, pressure line 36 may be pressurized during cavity filling. In general, pressure is transmitted to the molten polymer, through movable back pressure cylinder 40, after gate 20 is closed. Cooling fluid is circulating through cooling lines 44 at a temperature and flow rate chosen to provide cooling and solidification of the molten polymer at a desired rate. During solidification, the pressure applied through pressure line 36 is varied in such a manner as to create the desired refractive index gradient. After the polymer has solidified and sufficiently cooled, the mold is split apart along parting line 48.

Figure 3:
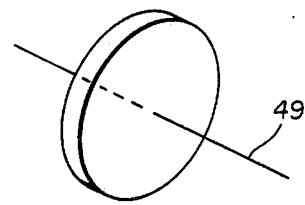
FIG. 3 shows a second illustrative embodiment of the invention in which a circular disk optical element has a refractive index that varies along its radius.
Figure 4:
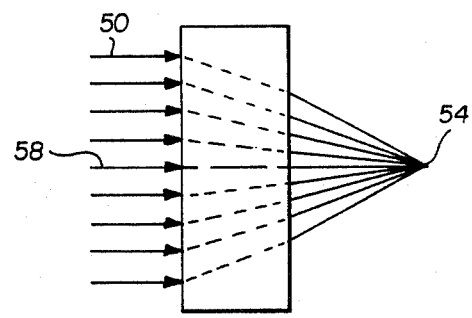
FIG. 4, included for purposes of explanation, shows a cross-section of an optical element of the present invention and one possible effect of the RIG upon incident light.

In another preferred embodiment of the invention, a disk-shaped optical element as shown in FIG. 3 is prepared by cutting the cylindrical element of FIG. 1 into disks. Light travels through the optical element of FIG. 3 along the direction of optical axis 49. Electromagnetic radiation is allowed to pass through the circular face of the disk which can be made to act as a lens by varying the refractive index in the radial direction. The formula governing the ray travel in a cylindrical element of the present invention as illustrated in FIG. 4 (see M. Born and E. Wolf, "Principles of Optics", second edition, MacMillan Co., New York (1959), page 124) is:

$$1/\rho = \nu \cdot \text{grad} \log n$$

where $\rho$ is the radius of curvature of the ray path 50, $\nu$ is the unit outward normal, i.e., a unit vector normal to the tangent of the ray path 54, and n is the refractive index. Thus, the refractive index must be a function of radial position in order to insure focusing. If the refractive index were independent of radial distance, parallel rays 50 would all curve through the same angles without focusing to a point 54 (or, in the case of negative lens, without having originated from a single virtual point).

The pressure applied to the solidifying cylindrically-shaped amorphous material can be increased, decreased, or follow any arbitrary program, depending on the desired direction and magnitude of the refractive index gradient. For a negative lens-like element, the refractive index must increase in the outward radial direction. Since refractive index increases with formation pressure, fabrication of a negative lens-like element would require a decrease in pressure during solidification. Conversely, fabrication of a positive lens-like element would require an increase in pressure during solidification. The gradient obtained for a given processing pressure can be increased if the pressure change during solidification is increased. While any pressure change during solidification will produce a refractive index gradient, the maximum processing pressure change should be preferably in the range 10,000–40,000 psi in order to produce a useful gradient with typical amorphous polymers. The pressure may be alternately increased and decreased during solidification to cause variations in refractive index not easily produced by standard lens-making or refractive index gradient-causing techniques.

Since longitudinal variation in the refractive index is normally unwanted, the ends of the cylindrical element of FIG. 1 might not be useful as disk-shaped optical elements due to edge effects caused by cooling and solidification in the axial direction. This problem can be minimized by choosing cylinders with high length-to-diameter ratios. Edge effects can also be decreased by insulating or even heating the ends of the mold used for preparing the cylindrical element. If longitudinal cooling can be sufficiently controlled, a mold with a disk-shaped cavity can be used to form the element and the step of forming and cutting a cylindrical element can be eliminated.

The rate of solidification of the amorphous material combined with the rate of pressure variation determine the refractive index gradient in the element. Increasing the rate of solidification without changing the rate of pressure variation will tend to decrease the refractive index gradient and decreasing the rate of solidification will tend to increase the refractive index gradient. To induce solidification, the mold should be maintained at a temperature below the glass transition temperature of the material. The heat transfer coefficient at the mold-material interface combined with the temperature difference between the mold and the molten material would then determine the rate of cooling of the material. Thus, the rate of cooling may be changed by changing the mold temperature. A higher mold temperature will lead to slower cooling of the material and a lower mold temperature will lead to faster cooling.

In general, the glass transition temperature of an amorphous material is dependent on the rate of temperature change. The exact relationship between mold temperature and the rate of vitrification is complex and it depends on the specific properties of the mold and the amorphous material. Mold temperatures in the range 30° to 70° C. below the glass transition temperature are preferred. The initial temperature of the molten amorphous material is preferably 50° to 150° C. above the glass transition temperature Tg and 100° to 300° C. above Tg if injection molding is used.

Appropriate materials, useful in the practice of the present invention as noted hereinabove, should be amorphous and transparent. The materials should also exhibit a glass transition temperature of greater than about 100° C.

Organic amorphous polymers are useful in the present invention. The term "amorphous polymer" follows the conventional definition, namely that the molecular structure of the material in the solid state is irregular, and substantially no crystallinity is detectable. Polymeric materials having a crystalline structure can exhibit a high degree of light scattering, and are, therefore, generally useless as light transmission media. Glassy polymeric materials are generally characterized by a Young's modulus on the order of about $10^{10}$ to about $10^{11}$ dynes/cm$^2$. The properties of amorphous glassy polymers are well known in the art (for example, see Meares, P., "Polymers: Structure and Bulk Properties", Van Nostrand Company Limited, London (1965), chap. 9). The materials most useful in the present invention should exhibit a relatively high glass transition temperature, Tg The glass transition temperature of a polymeric material is the temperature at which the material undergoes a transition from the glassy state to the rubbery or molten state. Materials having a glass transition temperature greater than about 100° C. may be used in the present invention, with preferred materials having a glass transition temperature greater than about 150° C. Although materials with a lower glass transition temperature may be used, such materials are generally not desirable, as a plastic element prepared from such a material may have a RIG which is not stable at room temperature. Polymeric materials useful in the practice of the present invention generally have a refractive index of about 1.5 and usually within the range 1.42–1.79. Moreover, polymeric materials preferred in most embodiments of the present invention have a low dispersion index (V) which is defined as $$V = \frac{n_D - 1}{n_p - n_C}$$

where $n_D$ is a refractive index at the sodium D line, $n_P$ corresponds to the hydrogen F line, and $n_C$ corresponds to the hydrogen C line. Generally, polymeric materials useful in the present invention have a dispersion index, V, within the range 35–50. In certain cases, however, a polymeric material having a higher dispersion index, in the range 50–60, may be useful. The polymeric materials utilized to form the matrix are preferably transparent and clear, i.e., colorless, although in certain applications a tinted transparent element may be desired. A partial listing of refractive and dispersion indices of some typical polymeric materials are listed in Table I hereinbelow.

TABLE I

Refractive and Dispersion Indices of Selected Amorphous Polymers

| Material | Refractive Index | Reciprocal Dispersive Power |
| --- | --- | --- |
| Poly(vinyl isobutyl ether) | 1.452 | |
| Poly(vinyl butyral) | 1.47–1.49 | |
| Poly(methyl acrylate) | 1.4725 (20°) | 59 |
| Poly(ethylidene dimethacrylate) | 1.4831 (20°) | 52.9 |
| Poly(methyl methacrylate) | 1.485–1.49 | |
| Poly(cyclohexyl-ethoxyacetate) | 1.4969 (20°) | 58 |
| Poly(cyclohexyl methacrylate) | 1.5066 (20°) | 56.2 |
| Poly(vinyl chloroacetate) | 1.512 (25°) | |
| Poly(methyl isopropenyl ketone) | 1.5200 (20°) | 54.5 |
| Poly(vinyl cyclohexene dioxide) | 1.5303 (20°) | 56.4 |
| Poly(vinyl chloride) | 1.54–1.56 | |
| Poly(p-methoxybenzyl methacrylate) | 1.551 (20°) | 32.5 |
| Poly(benzyl methacrylate) | 1.5680 (20°) | 36.5 |
| Poly(vinyl benzoate) | 1.5775 (20°) | 30.7 |
| Polystyrene | 1.59–1.60 | 30.8 |
| Poly(o-chloro-benzhydryl methacrylate) | 1.6040 (20°) | 30 |
| Poly(dichlorostyrene) | 1.62–1.64 | |
| Poly(vinyl phenyl sulfide) | 1.6568 (20°) | 27.5 |

Note: All temperatures are in centigrade.

An extensive description of polymers useful in the practice of the present invention is disclosed in U.S. Pat. No. 3,718,383 issued to Moore, the disclosure of which is incorporated herein by reference.

Inorganic glasses meeting the requisite transparency and glass transition temperature requirements may also be useful in the practice of the invention. Examples of inorganic glasses include silicates, borosilicates and alkali-borosilicates.

The elements of this invention preferably have a refractive index that increases or decreases from the center of the element to the outer circumference for the purpose of acting like a concave or convex lens element respectively.

The uses of optical elements with refractive index gradients are known in the art. These uses include both positive and negative cylindrical lens elements, planar lens elements having a refractive index gradient in only one direction, and elements in lightguiding or waveguiding systems. Further, the RIG elements of the present invention can be ground to have curved surfaces, enabling one to obtain a curved surface lens which possesses a refractive index gradient which is otherwise difficult to achieve. These uses are described in further detail in U.S. Pat. No. 3,718,383. Elements of the present invention are suitable for these uses. In addition to reducing production time, the method of the present invention allows one to obtain a great deal of control over the optical properties of the element by varying either the solidification rate of the amorphous material and/or the rate and direction of pressure variation.

The following example more fully illustrates the practice of the present invention.

EXAMPLE

A hot polystyrene melt was injected into a 1.27 cm diameter cylindrical cavity situated in a cooled steel mold as shown in FIG. 2. The initial temperature of the polystyrene melt was 250° C. and the mold was maintained at 85° C. by circulating water in the cooling lines running through the mold. When the cavity was filled, a shut-off gate was used to seal the molten polystyrene in the cavity and a back pressure of 25,000 psi was applied. During the time which it took the polystyrene to completely solidify (about 3 minutes), the pressure was allowed to decay to atmospheric pressure. The mold was then opened and the solid polystyrene cylinder was removed. The refractive index of the polystyrene cylinder was found to vary radially from 1.59 at the axis of the cylinder to 1.60 at the surface. Refractive index may be measured, for example with an Abbé refractometer.

The invention has been described in detail with particular reference to preferred embodiments thereof, but it will be understood that variations and modifications can be effected within the spirit and scope of the invention.

What is claimed is:

1. A method for the manufacture of an optical element having a varying refractive index, comprising the steps of:
   (1) cooling a molten amorphous material in such a manner as to cause it to gradually solidify; while simultaneously
   (2) varying the pressure applied to said material;
   in a manner such that said varying refractive index renders said optical element capable of guiding and focusing light.

2. A method for the manufacture of an optical element having a refractive index gradient, comprising the steps of:
   (1) introducing a molten amorphous material into a mold;
   (2) maintaining the temperature of the mold below the glass transition temperature of said material so as to cause gradual solidification of said material; while simultaneously
   (3) gradually changing the pressure applied to said material; and then
   (4) removing the solidified material from said mold;
   in a manner such that said varying refractive index renders said optical element capable of guiding and focusing light.

3. The method of claim 2 wherein said mold is cylindrically shaped.

4. The method of claim 2 wherein the pressure applied to said material is gradually increased.

5. The method of claim 2 wherein the pressure applied to said material is gradually decreased.

6. A method for the manufacture of an optical element having a refractive index gradient, comprising the steps of:
   (1) introducing a molten amorphous polymeric material into a cylindrically-shaped cavity in a mold;
   (2) maintaining the temperature of the mold below the glass transition temperature of said material so as to cause solidification of said material first at the outer circumference of the cylinder, then gradually along the radial axis of the cylinder, and finally at the longitudinal axis of the cylinder; while simultaneously
   (3) gradually changing pressure applied to said material from one end of the cylinder; then
   (4) removing the solid cylinder of amorphous polymeric material from said mold; and
   (5) cutting said solid cylinder along its circular face into circular disks;
   in a manner such that said varying refractive index renders said optical element capable of guiding and focusing light.

7. The method of claim 6 wherein the pressure applied to said material is gradually increased.

8. The method of claim 6 wherein the pressure applied to said material is gradually decreased.

9. The method of claim 6 wherein said amorphous polymeric material is polystyrene.

* * * * *